Figure 1:
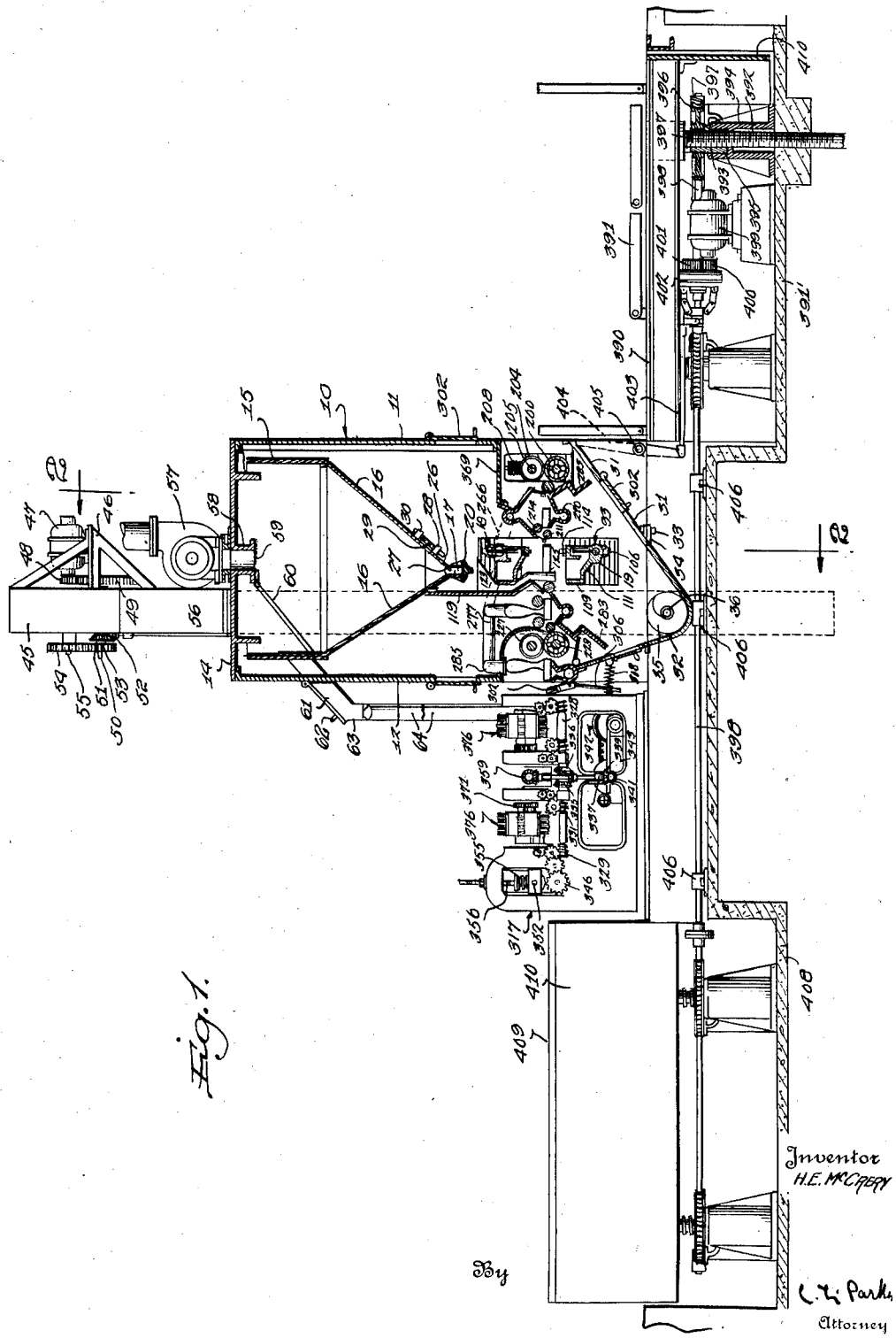

Oct. 25, 1932.                H. E. McCRERY                1,884,791
                          SCALE REMOVING APPARATUS
                          Filed June 6, 1927         10 Sheets-Sheet 4

Oct. 25, 1932.   H. E. McCRERY   1,884,791
SCALE REMOVING APPARATUS
Filed June 6, 1927   10 Sheets-Sheet 7

Inventor
H. E. McCRERY
By
Attorney

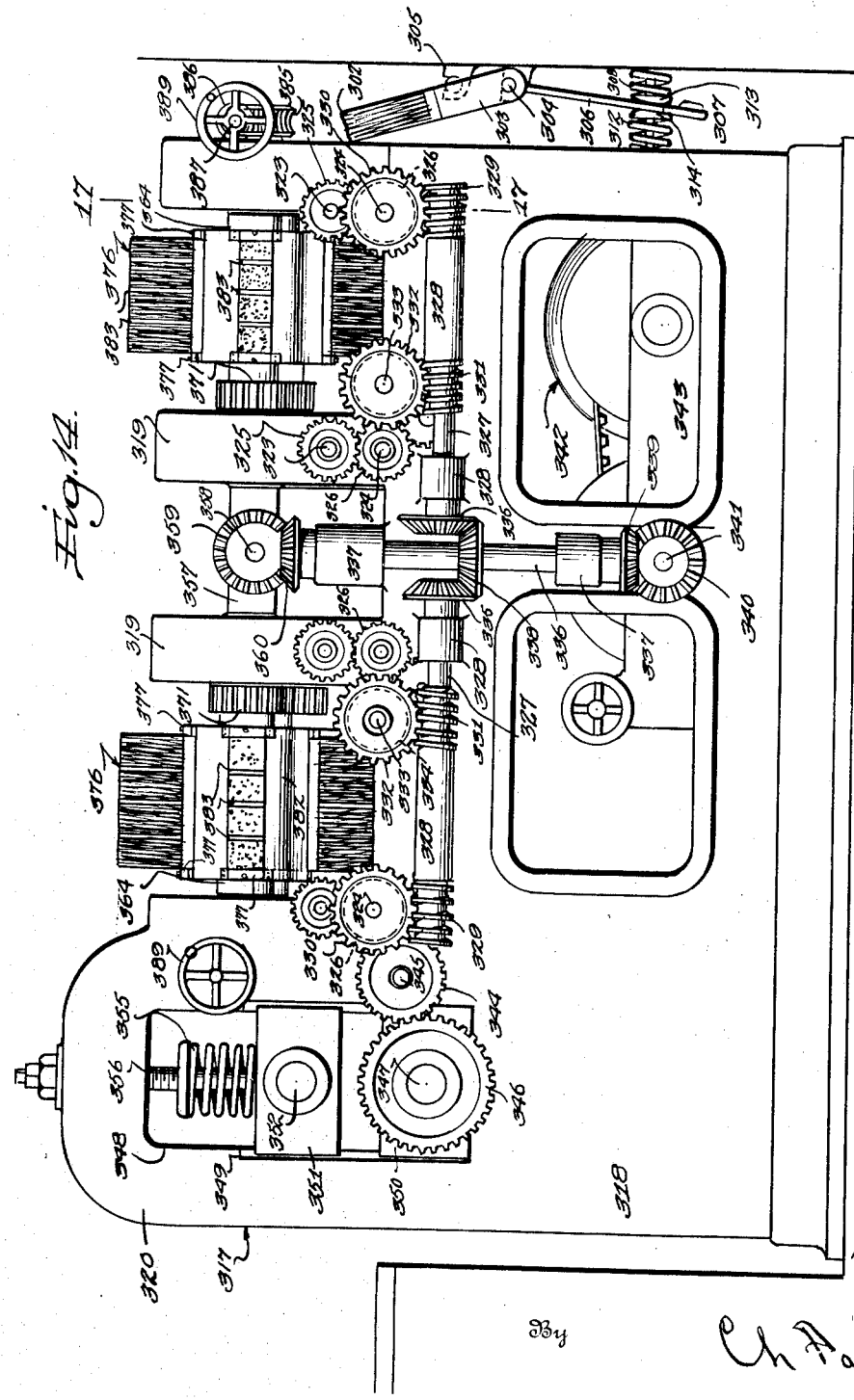

Oct. 25, 1932.  H. E. McCRERY  1,884,791
SCALE REMOVING APPARATUS
Filed June 6, 1927   10 Sheets-Sheet 9
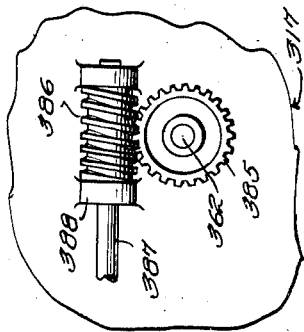
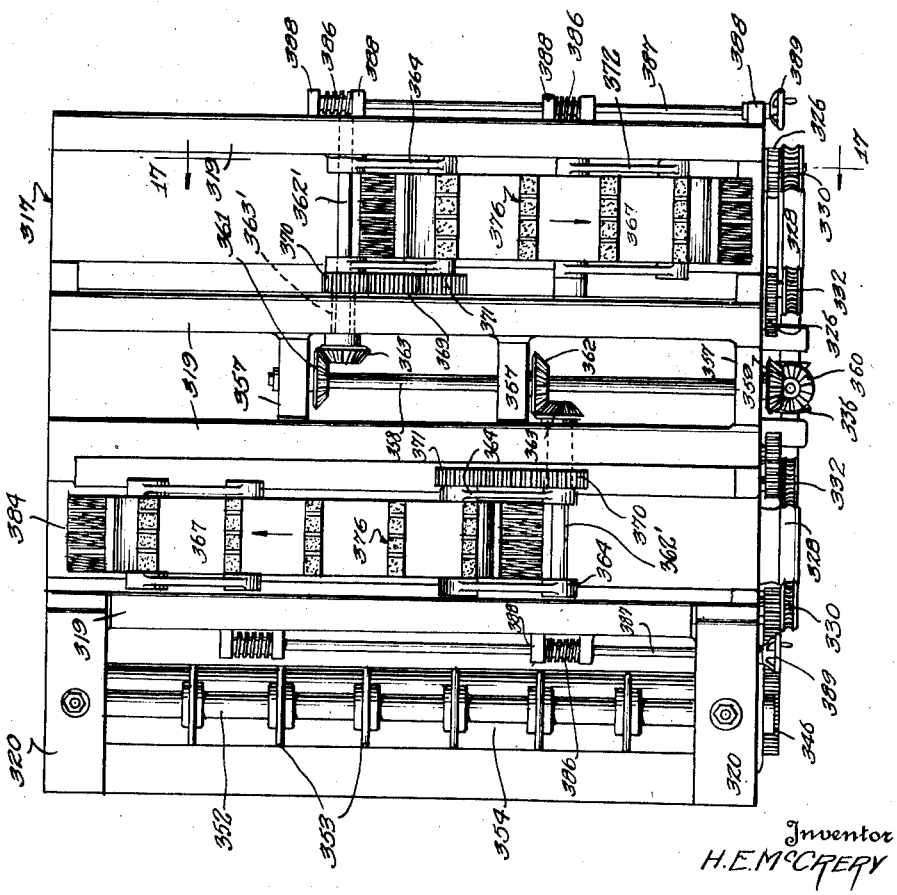
Inventor
H. E. McCRERY
Attorney

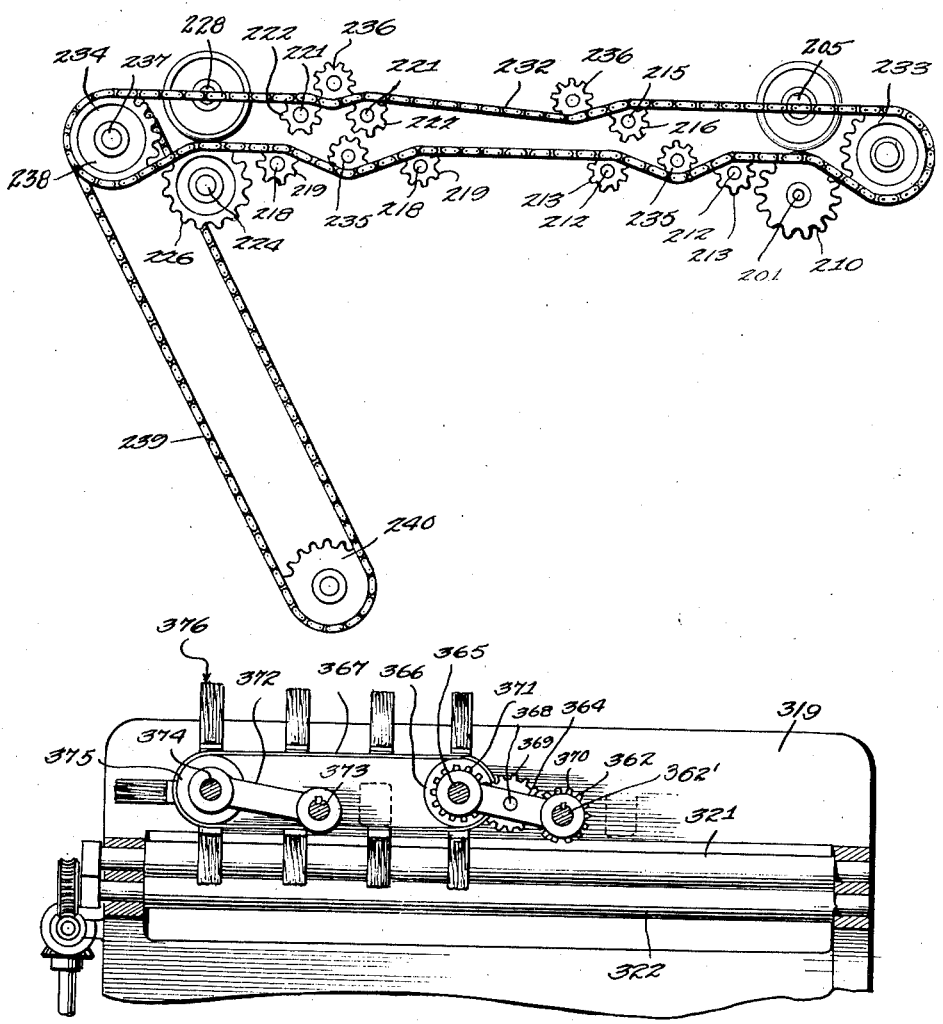

Patented Oct. 25, 1932

1,884,791

UNITED STATES PATENT OFFICE

HAROLD E. McCRERY, OF APOLLO, PENNSYLVANIA, ASSIGNOR, BY MESNE ASSIGNMENTS, TO BLAW-KNOX COMPANY, OF PITTSBURGH, PENNSYLVANIA, A CORPORATION OF NEW JERSEY

SCALE REMOVING APPARATUS

Application filed June 6, 1927. Serial No. 196,959.

This invention relates to apparatus for removing the scale from metal sheets, and more particularly sheets of iron and steel.

In the manufacture of sheets of iron there is formed on the surfaces of the sheets a heavy scale which must be completely removed before the sheets can be galvanized, or covered with surface coatings of various kinds such as paints and lacquers. It is the present practice to remove the scale by pickling the sheets in an acid bath, but such a procedure involves several disadvantages. The pickling operation requires considerable time and is not continuous, it being necessary to immerse and remove successive batches of the sheets. Some of the scale on the sheets adheres more tightly than others, and the pickling operation must be continued until the scale is wholly removed from the sheets. Accordingly it has been found that where the scale is relatively loose, the surfaces of the sheets are pitted by the action of the acid when the sheets are left in the pickling baths a sufficient length of time to remove the tightly adhering scale. After the pickling operation is completed, it is necessary to thoroughly wash the sheets to remove the acid as completely as possible to prevent corrosion of the sheets. The washing operation adds an additional step to the operation of removing the scale and consequently adds to the cost of the process. It further has been found that regardless of the thoroughness with which the sheets are washed, it is impossible to completely remove all of the acid since the latter finds it way into the pores of the metal and cannot be readily washed out. As a result, it is necessary to coat the sheets by galvanizing, painting or the like within a relatively short time after the completion of the washing operation to prevent the formation of corrosion.

In order to avoid the disadvantages incident to the removal of the scale, by the method outlined, attempts have been made to remove the scale mechanically by impacting abrasives against the surfaces of the sheets. No material degree of success has been attained by this method for several reasons which I have discovered and which are overcome by the use of the present apparatus. In the practice of methods for removing scale by blasts of sand or other abrasives, it has been found that the sheets often are pitted and streaked by the abrasive thus rendering the sheets unfit for use.

An important object of the present invention is to provide an apparatus whereby scale may be removed from metal sheets by a continuous operation, it merely being necessary to feed successive sheets of metal into the inlet side of the machine.

A further object is to provide an apparatus for removing the scale by impacting abrasive substances against the surfaces of the sheets without pitting the sheets or marring the surfaces thereof in any manner, thus providing finished sheets which are adapted for use where perfect finished surfaces are necessary.

A further object is to provide novel means for impacting the abrasive against the surfaces of the sheets.

A further object is to provide a novel form of apparatus for simultaneously subjecting both sides of a sheet to the action of abrasive blasts wherein the abrasive employed is impacted evenly throughout both surfaces of each successive sheet.

A further object is to provide an apparatus through which successive sheets are adapted to be fed horizontally, and to provide novel forms of blast devices arranged at spaced intervals across the width of the sheets and uniformly supplied with the abrasive material.

A further object is to provide novel means for feeding the sheets through the apparatus and means for preventing the abrasive material from injuring the feeding means.

A further object is to provide novel means for repeatedly using the abrasive material for removing the scale from successive sheets and for removing the foreign matter from the abrasive material after it has been impacted against the sheets.

A further object is to provide novel mechanical means for removing any remaining abrasive and other foreign material from the sheets after they have passed from the scale removing apparatus.

A further object is to provide an apparatus of the character referred to wherein the scale is thoroughly removed from the sheets without injuring the surfaces thereof and wherein the sheets may be left a relatively long time without coating, and without danger of corrosion of the surfaces of the sheets.

A further object is to provide novel means for properly positioning the sheets with respect to the scale removing apparatus to permit the sheets readily to be fed thereinto.

A further object is to provide coordinated feeding and take-off means for the sheets whereby the levels of the tops of the piles of treated and untreated sheets are maintained substantially constant at the inlet and outlet sides of the apparatus.

A further object is to provide novel means for reciprocating the abrasive impacting means transversely of the sheets, and for adjusting the distance between the sheets and impacting means and for adjusting the angular relation between the impacting means and the surfaces of the sheets.

Other objects and advantages of the invention will become apparent during the course of the following description.

Figure 2:
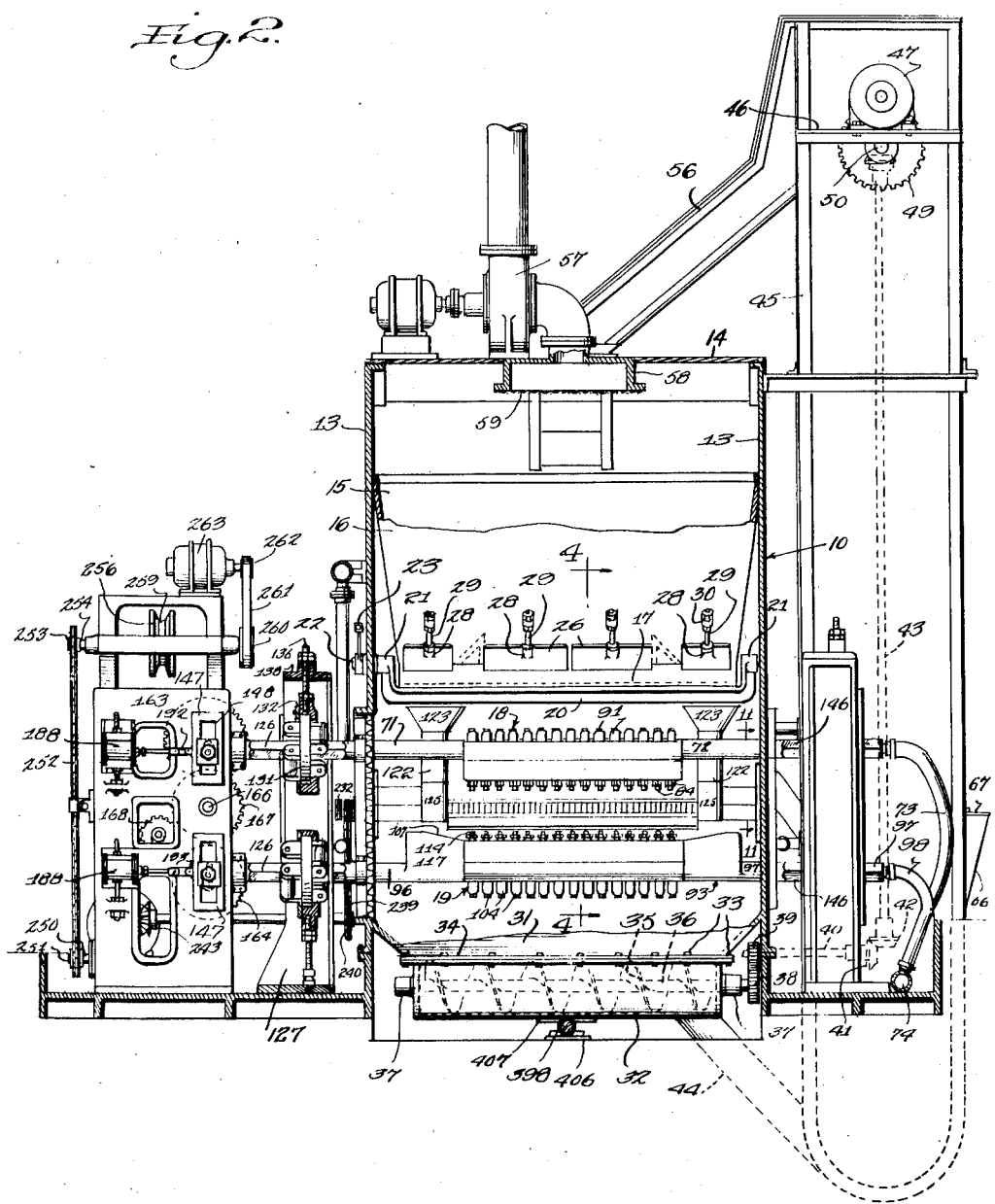
Figure 3:
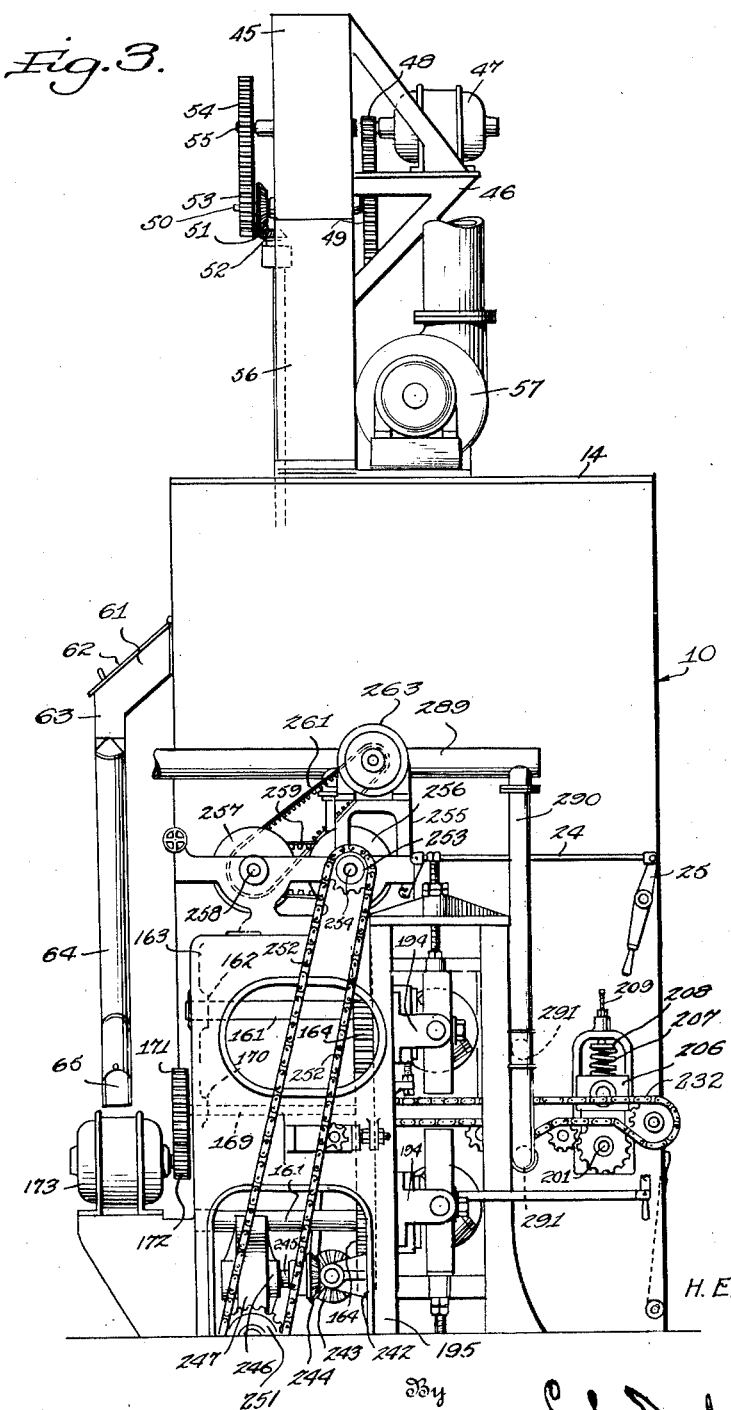
Figure 4:
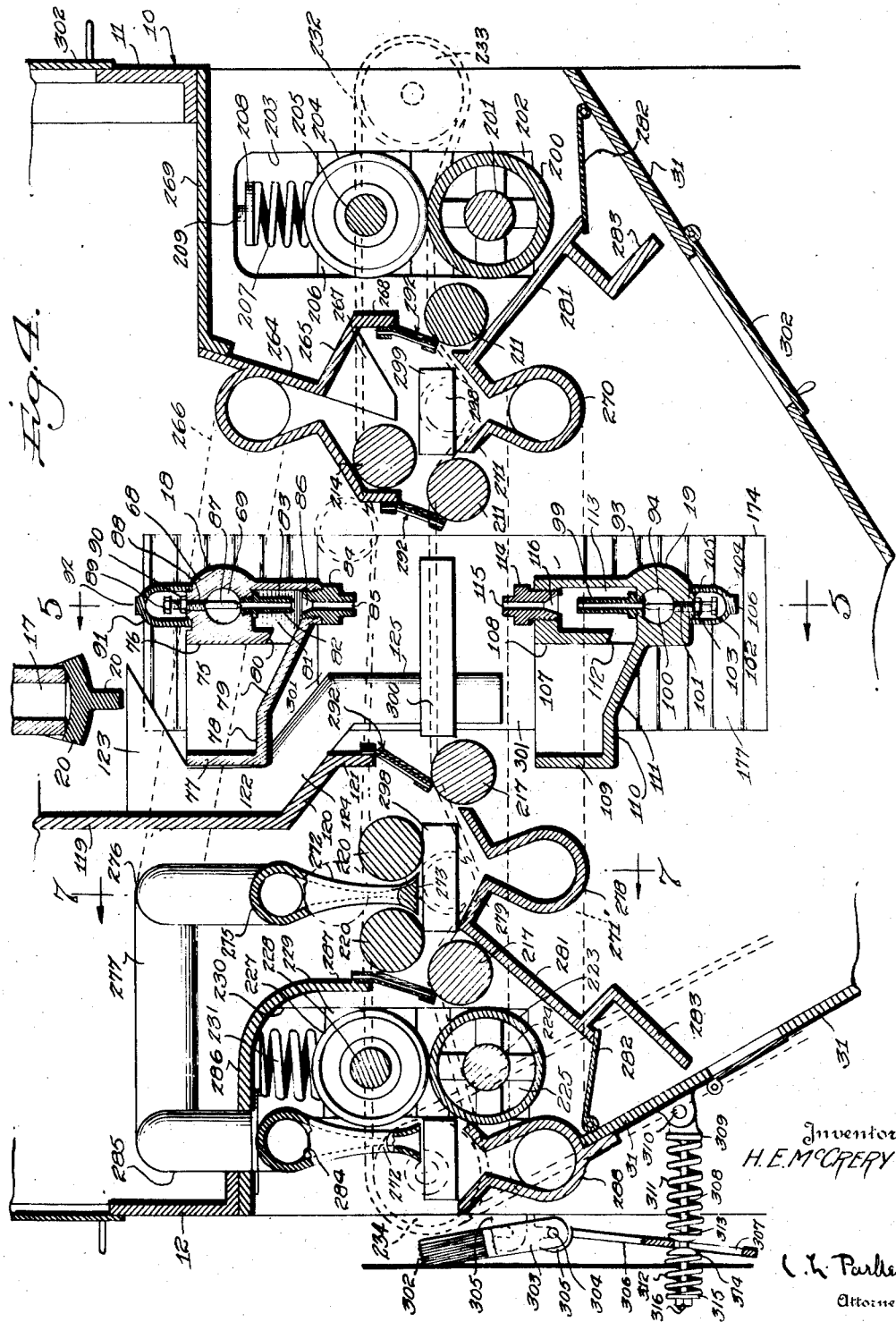
Figure 5:
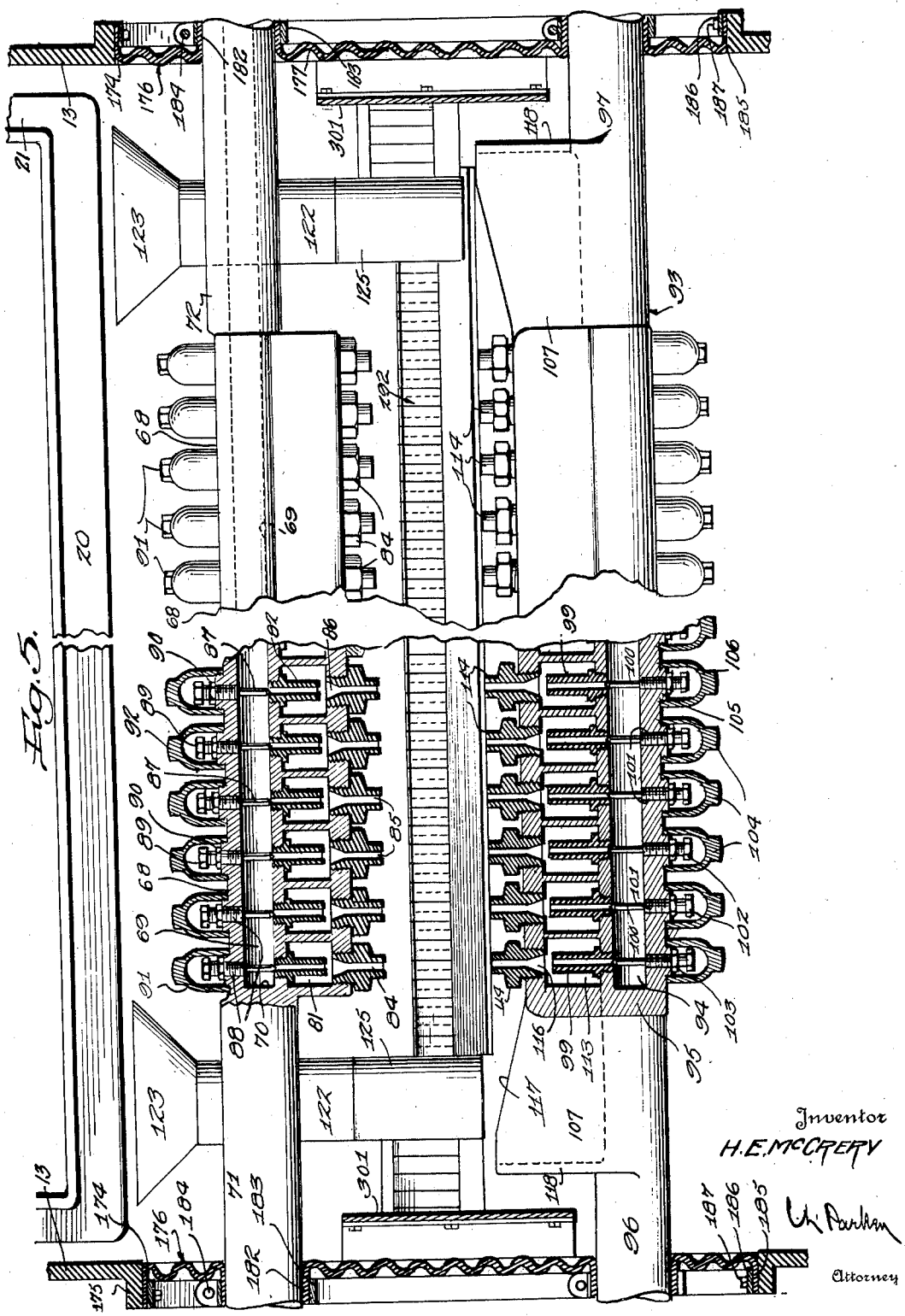
Figure 6:
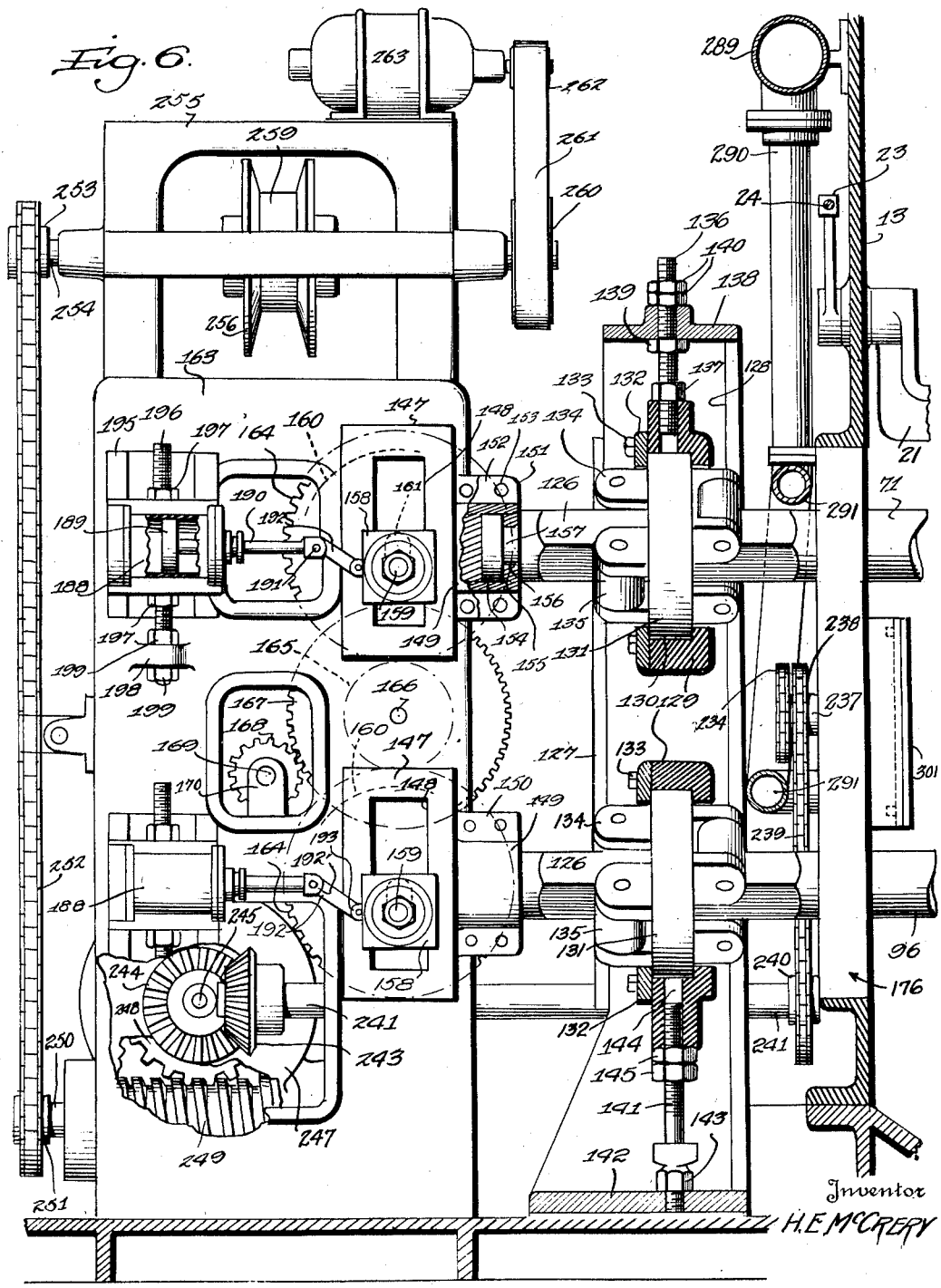
Figure 7:
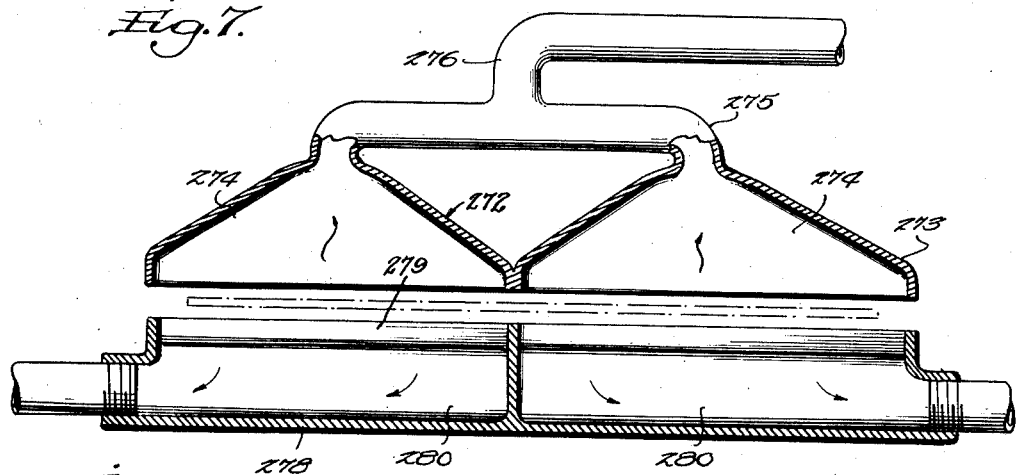
Figure 8:
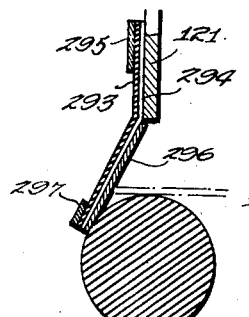
Figure 9:
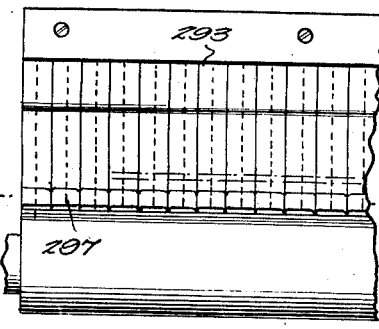
Figure 10:
Figure 12:
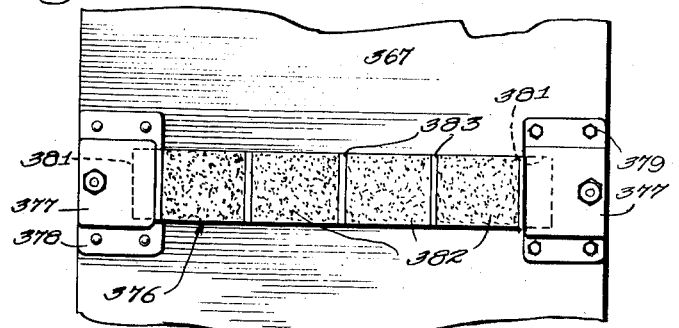
Figure 11:
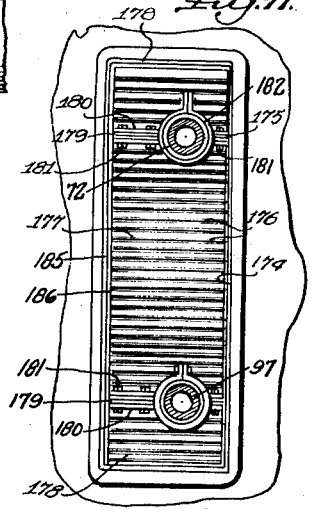
Figure 13:
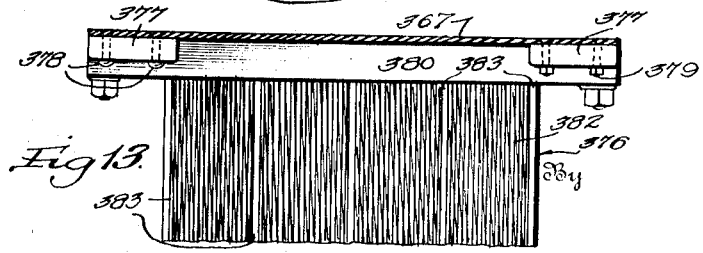

In the drawings I have shown one embodiment of the invention. In this showing,

Figure 1 is a vertical longitudinal sectional view through the apparatus, parts being shown in elevation, Figure 2 is a transverse vertical sectional view taken substantially on line 2—2 of Figure 1, Figure 3 is an enlarged side elevation of a portion of the apparatus, Figure 4 is an enlarged fragmentary vertical longitudinal sectional view taken substantially on line 4—4 of Figure 2, Figure 5 is an enlarged transverse vertical sectional view of a portion of the apparatus taken substantially on line 5—5 of Figure 4, parts being shown in elevation, Figure 6 is an enlarged side elevation of the operating means for the abrasive impacting devices, parts being shown in section, Figure 7 is a section taken substantially on line 7—7 of Figure 4, Figure 8 is a detail sectional view of one of the guide rolls and associated elements, Figure 9 is a fragmentary side elevation of one of the guide rolls and associated elements, Figure 10 is a detail section on line 10—10 of Figure 9, Figure 11 is a detail section on line 11—11 of Figure 2, Figure 12 is an edge elevation of one of the traveling cleaner brushes, Figure 13 is a detail section through a portion of one of the traveling brush belts showing the brush in position thereon, Figure 14 is a side elevation of the cleaning apparatus, Figure 15 is a plan view of the same, Figure 16 is a detail elevation of a portion of the cleaning apparatus showing the brush adjusting means, Figure 17 is a fragmentary sectional view on line 17—17 of Figure 14, and, Figure 18 is a fragmentary side elevation of the drive means for the feed and guide rollers of the scale removing apparatus.

Referring to the drawings the numeral 10 designates the casing of the scale removing apparatus as a whole including front and rear walls 11 and 12 respectively, side walls 13, and a cover 14. A hopper 15 is arranged within the casing and is adapted to contain a suitable abrasive to be impacted against the sheets to be cleaned. The front and rear walls 16 of the hopper converge toward their lower ends and terminate in a discharge spout 17 extending substantially throughout the width of the hopper, as shown in Figure 2. The hopper is adapted to contain any suitable abrasive substance, such as steel particles, although sharp sand or other materials may be employed. The abrasive material is adapted to be fed downwardly through the spout 17 to supply upper and lower abrasive impacting members indicated as a whole by the numerals 18 and 19 respectively, and the flow of abrasive from the spout is adapted to be shut off by a gate 20. This gate is provided at its ends with upstanding arms 21 secured to shafts 22, one of the shafts extending through the adjacent wall 13 and being provided with a crank 23. The free end of this crank is connected by a rod or link 24 to one end of a lever 25, the opposite end of this lever being adapted to be employed as a handle for operating the gate 20. The gate 20 is employed when desired to stop the flow of abrasive downwardly through the spout, and valves 26 are adapted to control the rate of discharge of the abrasive material. The valves 26 are in the form of plates extending along one of the hopper walls 16 and operate through openings 27 formed in the discharge spout 17. The valves are provided with a plurality of lugs 28 in which are threaded bolts 29, the upper ends of these bolts being secured to lugs 30 carried by the adjacent hopper wall 16. The bolts 29 obviously are adapted to be operated to adjust the position of the valves 26 to control the passage of abrasive through the discharge spout 17.

After the abrasive has been impacted against the sheets in a manner to be described, it is discharged into a receiving hopper 31 forming the bottom of the casing 10. A conveyor trough 32 is arranged beneath the hopper 31 and is secured thereto by bolts 33 passing through flanges 34 formed on the adjacent edges of the hopper 31 and trough 32.

A spiral conveyor 35 is arranged within the trough 32 and is carried by a shaft 36 journalled in bearings 37 carried in the ends of the trough 32. One end of the shaft 36 is provided with a gear 38 meshing with a pinion 39 carried by a shaft 40. A bevel gear 41 is secured to the shaft 40 and meshes with a similar gear 42 carried by the lower end of a vertical shaft 43. Rotation of the shaft 43 is adapted to drive the conveyor 35 to move material in the trough 32 to a discharge pipe 44 communicating with one end of the trough 32. The pipe 44 is adapted to convey the abrasive material to a vertical conveyor 45 which carries the shaft 43 as shown in Figure 1.

A platform 46 is carried by the conveyor 45 adjacent its upper end and supports a motor 47. A pinion 48 is driven by the motor and meshes with a gear 49 carried by a shaft 50 extending through the housing of the conveyor, and a bevel gear 51 is secured to the opposite end of the shaft 50. The latter gear meshes with a bevel gear 52 carried by the upper end of the shaft 43 whereby it will be apparent that rotation of this shaft is accomplished by the motor 47. The shaft 50 also carries a gear 53, outwardly of the bevel gear 51, and a gear 54 meshes with the gear 53 to drive the upper shaft 55 of the conveyor 45. Material thus will be elevated by the conveyor 45 from the pipe 44, and at the upper end of the conveyor, the abrasive material is discharged into a spout 56 from whence it falls into the hopper 15.

From the foregoing it will be apparent that the abrasive material, after being impacted against the sheets to be cleaned is conveyed to the top of the hopper 15 and dumped thereinto. This material carries fine particles of scale removed from the sheets, and the particles of the foreign material have been found to be smaller and lighter than the particles of the abrasive material. The scale particles are of no assistance in removing scale from successive sheets, and accordingly it has been found advisable to remove such foreign matter from the abrasive material. For this purpose, a blower 57 is mounted on the top of the casing 10 and the inlet side of the blower communicates with the upper end of the hopper through a connection 58. A screen 59 covers the lower end of the connection 58 to prevent any of the particles of abrasive material from being removed from the hopper, as will be apparent.

As previously stated, however, the particles of foreign matter are lighter than the particles of abrasive, and accordingly the blower 57 may be operated at a suitable speed to pick up the particles of foreign material without attracting any material part of the abrasive. Thus very little of the abrasive will find its way to the lower end of the pipe 58, and this abrasive will be stopped from passing out of the casing by the screen 59.

Abrasive material of different degrees of coarseness is employed under different conditions, and accordingly it is desirable to provide means for emptying the hopper 15 when desired. A gate 60 is pivotally connected at its upper end to the conduit 58 and normally assumes a vertical position. When it is desired to empty the hopper of abrasive material, the gate 60 is swung to the position shown in Figure 1 and the material discharged into the hopper from the spout 56 falls upon the gate 60 and is conveyed outwardly from the casing through a pipe 61. A clean-out door 62 may be provided in the pipe 61 if desired. The pipe 61 discharges abrasive material into a vertical pipe 63, and this pipe is provided with branches 64 to convey the abrasive to opposite sides of the apparatus for a purpose to be described. The lower ends of the pipe 64 may be provided with doors 65. The portion of the apparatus just described is adapted to empty the hopper of material, and for the purpose of refilling the hopper a small spout 66 communicates with the conveyor 45 and is provided with a door 67. When it is desired to fill the hopper 15 material is simply fed into the small hopper 66 to be conveyed upwardly to the discharge spout 56 and thence to the hopper 15.

Referring to Figures 4 and 5 it will be noted that the upper abrasive impacting device 18 comprises a preferably integral body 68 having an elongated circular air passage 69 extending throughout the greater portion of the length thereof. One end of the passage 69 is closed as indicated at 70 (see Figure 5). The body of the abrasive impacting member is provided with oppositely extending shaft portions 71 and 72, preferably arranged in alinement with the passage 69. The shaft portion 72 extends through one of the end walls 13 of the casing 10 and is supported therein in a manner to be described. The passage 69 extends entirely through the shaft portion 72, and air is supplied thereto by a flexible hose 73 the lower end of which is connected to a conduit 74 to which air under pressure is supplied from any suitable source.

Rearwardly of the passage 69 the upper impacting member is provided with a trough 75 extending longitudinally thereof and provided with front and rear walls 76 and 77 respectively. The trough is entirely open throughout its length and is adapted to be supplied with abrasive directly from the spout 17, as will be apparent in Figures 1 and 4. The rear portion of the trough 75 is provided with a flat bottom wall 78 and an inclined bottom wall 79, the lower end of the front wall 76 terminating a substantial distance above the wall 79 as indicated at 80. The space provided between the lower end 80 of the front wall of the trough and the bottom wall 79 thereof affords communication between the trough and jet chambers 81. A plurality of jets 82 are mounted in the chambers 81 and are threaded into the upper walls of these chambers, as clearly shown in Figure 4. Each of the jets is provided with a small axial passage 83 communicating at its upper end with the passage 69. A nozzle 84 is threaded in the bottom of the impacting device in vertical alinement with each of the jets 82. Each of the nozzles is provided with a passage 85 extending upwardly therethrough and terminating in a conical upper end 86. The abrasive material flows into the chambers 81 from the trough 75, and is blown through each of the nozzles 84 by its corresponding jet 82. An adjusting valve 87 is adapted to control the supply of air to each of the jets 82. Each of the valves is provided with a conical lower end arranged adjacent the upper end of one of the jets 82, and the upper end of each valve is threaded into the impacting device as at 88. A nut 89 is adapted to rotate each adjusting valve, and a lock nut 90 secures each valve in position. A cover 91 is threaded on each upstanding projection formed integral with the impacting member and arranged concentric with each of the valves 87. At its upper end, each cover 91 is provided with an upstanding polygonal portion 92 preferably corresponding in shape and size to the nuts 89 and 90 to permit the same wrench to be employed for operating these elements.

The lower impacting device 19 comprises a preferably integral cast body 93 which is substantially the same as the upper impacting device except that all of the parts are inverted except the trough. Referring to Figures 4 and 5, the body 93 also is provided with an air passage 94 extending longitudinally with respect to the impacting device and this passage is closed at one end as indicated at 95. The lower impacting device also is provided with oppositely extending shaft portions 96 and 97 similar to the shaft sections 71 and 72. The passage 94 extends through the shaft section 97 and is connected to a flexible air hose 98 which also is connected to the conduit 74.

The passage 94 is adapted to supply air to a plurality of jets 99, and a valve 100 controls the amount of air supplied to each jet. These valves also are threaded into the body of the impacting device as at 101 and are provided with operating and lock nuts 102 and 103 respectively. Covers 104 are threaded on projections 105 formed integral with the body 93, and each cover also is provided with a polygonal extension 106 corresponding in shape and size to the nuts 102 and 103. A trough 107 is formed integral with the body of the lower impacting device and is provided with front and rear walls 108 and 109 respectively. The trough 107 is also provided with horizontal and inclined bottom portions 110 and 111 respectively. The lower end of the wall 108 terminates a substantial distance above the inclined wall 111 as at 112 to permit the abrasive material in the trough 107 to be fed into jet chambers 113. Blast nozzles 114 are threaded into the body of the lower impacting device and are provided with axial passages 115 extending therethrough, the lower ends of these passages being conical as indicated at 116. The trough 107 extends along the shaft sections 96 and 97 a substantial distance beyond the outermost nozzles 114. The front and rear walls of the trough 107 adjacent the ends of the trough, are materially increased in height as indicated at 117, to add depth to the trough for a purpose to be described. The ends of this trough are closed by walls 118.

A partition 119 extends transversely of the casing 10 as indicated in Figures 1 and 4. This partition is provided with a vertical portion secured at its upper end to the adjacent wall of the hopper 15, and below this hopper the partition is inclined inwardly and downwardly as at 120, the lower end of the partition terminating in a short vertical portion 121. Discharge spouts 122 are carried by the partition 119 adjacent opposite walls 13 of the casing 10, as shown in Figures 2 and 5. The spouts 122 are arranged beyond the ends of the trough 75 and have upper enlarged ends 123 which are open to receive abrasive material from the end portions of the spout 17. Each spout 122 also is provided with a downwardly and inwardly inclined portion 124 resting upon the inclined portion 120 of the partition, and the lower ends 125 of the spouts are vertically arranged and open at their lower extremities to discharge material into the end portions of the trough 107 as clearly shown in Figures 4 and 5.

The abrasive impacting devices are adapted to be reciprocated in alinement with the nozzles thereof while sheets are passing therebetween to subject the entire surface of the sheets to the action of the abrasive blasts. Referring to Figures 2 and 6, it will be noted that the shaft sections 71 and 96 extend through the adjacent wall 13 of the casing 10 and are provided with squared portions 126. An open sided frame 127 is arranged adjacent the squared portions of the shafts and this frame is provided in opposite sides with guides 128 arranged on opposite sides of the square shaft portions. Supports 129 are vertically slidable in the guides 128, and each of these supports is provided with a cylindrical recess 130 in which a shaft guide member 131 is arranged. One of the supports 129 and its corresponding shaft guide member 131 surrounds each of the squared shaft portions 126 and the members 131 are adapted to be held in position by circular plates 132 secured to the supports 129 by bolts 133. Each of the guide members is provided on opposite faces with ears 134 arranged in pairs and rotatably supporting guide rollers 135. Each guide roller 135 is arranged parallel to the roller on the same side of the guide member 131 and at right angles to the rollers at the opposite side. It will be apparent therefore that each face of each squared shaft portion 126 is engaged by one of the rollers 135 whereby these elements act as guides and bearings for the shafts 71 and 96, and accordingly the shafts are adapted to be reciprocated between the rollers 135 and the nozzles 84 and 114 are maintained at a fixed angle with respect to sheets passing therebetween. If it is desired to project abrasive against the surfaces of the sheets at a different angle, it merely is necessary to loosen the bolts 133 and rotate the members 131, thus turning the shafts 71 and 96.

Means are provided for vertically adjusting the supports 129 to vary the distances of the nozzles 84 and 114 from the opposite sides of the sheets being cleaned. As shown, a screw 136 is threaded at its lower end in the upper portion of the upper support 129 and is secured thereto by a lock nut 137. The screw 136 also is threaded in the transverse top 138 of the frame 127. A lock nut 139 engages against the lower face of the transverse member 138, while similar nuts 140 are arranged above this member. By loosening the lock nuts and turning down the lower nut 140, the upper support 129 may be elevated, and conversely the support 129 may be lowered by turning the nuts 140 upwardly. The nuts 139 and 140 are tightened when the upper support 129 is in the desired position. A screw 141 also is threaded into the base 142 of the frame 127 and is secured to the base by nuts 143. The upper extremity of the screw 141 is slidable in an opening 144 formed in the bottom of the lower support 129, and nuts 145 are threaded on the screw 141 and contact with this support to hold it in the desired position. The lower support 129 may be elevated or lowered by turning the upper nut 145 upwardly or downwardly. When the lower support 129 is in the desired position, the lower nut 145 is tightened against the upper nut.

The shaft sections 72 and 97 also project through their adjacent wall 13 and are provided with squared portions 146, as shown in Figure 2. These squared shaft portions are supported and guided by means similar to those employed in connection with the shaft sections 126 previously described, and need not be referred to in detail.

Means are provided for reciprocating the impacting devices through the projecting shafts 71 and 96. Referring to Figure 6, the numeral 147 designates upper and lower frames having vertical relatively wide slots 148 formed therein. Each of the frames 147 is provided inwardly thereof with a substantially semi-cylindrical extension 149 having outwardly projecting ears 150. A cap 151 having similar ears 152 is secured to each extension 149 by bolts 153. The extensions 149 and caps 151 form complementary members by means of which a swivel connection is provided between the frames 147 and the adjacent ends of the shafts 71 and 96. Each of these shafts is provided with a cylindrical end 154 arranged in a similarly shaped recess 155 formed in the corresponding extensions and caps 151 and the latter element are further provided with retricted cylindrical openings 156 through which the necks 157 extend, these necks connecting the cylindrical portions 154 to the shaft ends. It will be apparent that the swivel connections between the shafts 71 and 96, and the frames 147 permit the shaft to be adjusted in any angular position without effecting the frames 147.

The slots 148 form guides to receive blocks 158, the latter being adapted to reciprocate in the slots 148 in a manner to be described. The blocks 158 are secured by cranks 159 to disks 160, these elements being mounted upon shafts 161. The shafts 161 are journalled in suitable bearings 162 carried by a preferably hollow cast supporting frame 163, as shown in Figure 3. Each shaft 161 is provided with a gear 164, and these gears mesh with a pinion 165 secured to the shaft 166 journalled in the frame 163. The shaft 166 also carries a larger gear 167 meshing with a pinion 168 carried by the shaft 169. The shaft 169 is journalled in bearings 170 and is provided outwardly of the frame 163 with a gear 171 meshing with a pinion 172 mounted upon the armature shaft of a motor 173. It will be apparent that the gear 165 is adapted to be driven from the motor 173 to rotate the gears 164, and thus drive the disks 160 and reciprocate the frames 147, by virtue of the arrangement of the cranks 159 concentric with respect to their corresponding disks.

Means are provided for preventing the escape of abrasive material outwardly through the walls 13 around the shafts 71, 72, 96 and 97. As shown in Figures 6 and 11, each wall 13 is provided with an opening 174 surrounded by a flange 175 formed integral with the wall. A flexible element is arranged in each opening 174 and is indicated as a whole by the numeral 176. This flexible element is formed of a central section 177, and upper and lower sections 178, the adjacent edges of these sections being turned outwardly as at 179 and clamped together by plates 180 through which are passed bolts 181. The portions of the flexible sections 177 and 178 which surround the projecting shaft portions are also provided with outwardly turned portions 182 snugly surrounding the shaft portions and secured thereto by clamps 183 having split ends through which are passed bolts 184. The portions of the flexible element adjacent the opening 174 are provided with outwardly turned portions 185 which lie against the flanges 175, metal strips 186 being arranged against the outwardly turned portions 185 and secured in position by bolts 187. The flexible element 176 is preferably formed of relatively heavy corrugated leather to permit the abrasive and packing devices to be reciprocated and adjusted vertically.

Owing to the weight of the abrasive impacting devices, it is desirous to provide some shock absorbing or cushioning means operative at the ends of the strokes of these elements. Accordingly I have provided a pair of dash pot cylinders 188 in which pistons 189 are reciprocable. These pistons are secured to rods 190, the outer ends of which are pivotally connected as at 191 through links 192. The inner ends of these links are pivotally connected as at 192′ to projections 193 carried by the blocks 158. The cylinders 188 are provided with inwardly extending portions 194 mounted in guides 195 preferably formed integral with the frame 163. A bolt 196 extends through each inwardly projecting portion 194 and is provided with nuts 197 engaging the upper and lower faces of the cylinder projection. The lower end of each bolt passes through an outwardly extending lug 198 carried by the frame 163, and nuts 199 secure the bolts 196 to the lugs 198. It will be apparent that the bolts 196 are normally fixed with respect to their supporting lugs 198 and vertical adjustment of the dash pots is accomplished by adjusting the nuts 197. Such vertical adjustment is necessary only when the supports 129 are moved upwardly or downwardly to vary the distances of the abrasive impacting devices from the surfaces of the sheets being treated.

Means are provided for feeding the sheets through the scale removing apparatus and for guiding them in their passage therethrough. Referring to Figure 4, the numeral 200 designates a lower feed roll carried by a shaft 201 journalled in bearings 202 fixed within an opening 203 formed within the side walls 13. A second roll 204 is arranged above the roll 200 and is mounted upon a shaft 205 journalled in bearings 206. The latter bearings are slidable vertically in the openings 203 and are normally urged downwardly by springs 207. Referring to Figure 3, it will be noted that a plate 208 rests upon the upper end of each spring 207 and a screw 209 contacts with each plate 208 to adjust the tension of the spring. The roll 200 is driven in a manner to be described to cause the sheets to be fed through the apparatus. The springs 207 are adapted to hold the sheets in firm contact with the roll 200 to be driven thereby, and the springs also permit upward movement of the bearings 206 to permit the roll 204 to accommodate itself to sheets of varying thicknesses. Referring to Figure 18, it will be noted that the shaft 201 is provided on one end outwardly of the casing 10 with a sprocket 210 adapted to be driven in a manner to be described.

Between the roll 200 and the center of the casing 10, a pair of lower guide rolls 211 are arranged. These guide rolls are mounted upon shafts 212 supported in suitable bearings in the casing and one end of each of these shafts is provided with a sprocket 213 arranged in alinement with the sprocket 210. An upper guide roll 214 is arranged above and slightly outwardly of the inner guide roll 211, as clearly shown in Figure 4. This roll is carried by a shaft 215 which also is provided with a sprocket 216. Lower guide rolls 217, similar to the rolls 211, are arranged between the center of the casing and the outlet side of the apparatus. These rolls are mounted upon shafts 218 carrying the sprockets 219 arranged outwardly of the casing and in alinement with the other sprockets referred to. Upper guide rolls 220 are arranged above the rolls 217 and are mounted upon shafts 221 carrying sprockets 222 on one end. The shafts 218 and 221 also are suitably journalled in the casing 10, as will be apparent.

Referring to Figure 4, the numeral 223 designates a feed roll arranged adjacent the outlet side of the apparatus and mounted upon a shaft 224. The shaft 224 is journalled in a bearing 225 similar to the bearing 202 previously described. This shaft also carries a sprocket 226 similar to the sprocket 210, as shown in Figure 18. A roll 227 is arranged above the roll 223 and is mounted upon a shaft 228 journalled in vertically sliding bearings 229 arranged in guide openings 230 similar to the openings 203 previously described. The upper roll 227 also is normally urged downwardly by springs 231 similar to and adapted to be adjusted in the same manner as the springs 207.

The feed and guide rolls are adapted to be driven by an endless chain 232 as shown in Figure 18. The lower run of the chain passes over the sprockets 210, 213, 219, and 226, as clearly shown. The upper run of the chain passes over the sprockets 222 and 216. The ends of the chain pass around sprockets 233 and 234 respectively. Idler sprockets 235 are arranged between the pairs of sprockets 213 and 219 to assure an efficient driving connection between the chain and the latter sprockets. Similarly, idler sprockets 236 are arranged adjacent the sprockets 216 and 222 for the same purpose.

The sprocket 234 is secured to a shaft 237 which also carries a sprocket 238 as shown in Figure 6. The upper portion of a chain 239 passes around the sprocket 238 and this chain is adapted to be driven by a sprocket 240 mounted upon a shaft 241 journalled in bearings 242 (see Figure 3). The opposite end of the shaft 241 is provided with a bevel gear 243 which meshes with a similar gear 244 mounted upon a shaft 245. This shaft is journalled in bearings 246 (see Figure 3) carried by a casing 247 in which is arranged a worm wheel 248 carried by the shaft 245. As shown in Figure 6, a worm 249 is carried by a shaft 250 and meshes with the worm wheel 248. The shaft 250 carries a sprocket 251 about which passes a chain 252, the upper end of this chain passing around a sprocket 253 mounted upon a shaft 254.

Any suitable means may be employed for driving the shaft 254, and in practice I prefer to use an electric motor as the drive means and a variable speed friction drive for transmitting power from the motor to the shaft 254. Referring to Figures 3 and 6 the numeral 255 designates a support in which the shaft 254 is journalled. This shaft is provided within the support 255 with a pair of movable conical members 256 comprising a friction drive pulley. A pair of similar conical members 257 are slidable on a shaft 258 journalled in the support 255. A friction belt 259 passes around the friction pulleys. Any suitable means may be employed for simultaneously moving one set of conical members away from each other and the other set toward each other to vary the speed ratio between the shafts 254 and 258. The friction drive means referred to is conventional and need not be referred to in detail. A pulley 260 is mounted upon the shaft 258 as shown in Figure 6. A belt 261 passes about this pulley and about a drive pulley 262 driven by a motor 263 arranged on the top of the support 255.

Means are provided for preventing injury to the drive and feed rolls of the apparatus by the abrasive material employed. Referring to Figure 4 the numeral 264 designates a vacuum hood as a whole having a flared lower portion 265 arranged over the guide roll 214. The vacuum hood extends transversely of the casing 10 and is connected to the vacuum pipe 266. It will be obvious that the sheets to be treated pass between the rolls 211 and 214 and a plurality of upper stationary guide members 267 are preferably cast integral with the hood and serve to properly guide the sheets. The lower extremities of the hood are vertically arranged as at 268 and terminate above the plane of travel of the sheets. A closure plate 269 is arranged between the upper end of the hood and the wall 11 to afford protection to the feed rolls 200 and 204. A similar vacuum hood 270 is arranged beneath the other hood and is provided with an upper flared portion 271 arranged between the rolls 211. This hood also extends transversely of the casing and is connected to a vacuum pipe 271'.

Referring to Figures 4 and 7 the numeral 272 designates an upper vacuum hood having its lower end 273 arranged between the rolls 220. The hood is preferably divided into compartments 274 to more efficiently pick up abrasive particles from the tops of the sheets passing thereunder. The compartments 274 are connected by a pipe 275 which in turn is connected to a vacuum pipe 276. The latter pipe also connects with the pipe 266 previously described and to a pipe 277. A lower hood 278 is arranged beneath the hood 272 and has a flared upper portion 279 arranged between the rolls 217. The hoods 270 and 278 are substantially identical and are constructed as shown in Figures 4 and 7. It will be noted that these hoods also are preferably divided into compartments 280, and the same is true of the upper hood 264 previously described. The hood 278 also is connected to the pipe 271'. For a purpose to be described, each of the hoods 270 and 278 is provided with a downwardly inclined wall 281 extending toward the adjacent lower hopper wall 31. A manually operable door 282 closes the space between the end of each wall 281 and the adjacent hopper wall 31. Near its lower end, each wall 281 is provided with an offset portion 283 slightly spaced from the adjacent hopper wall 31. As shown in Figure 4, a hood 284, similar to the hood 272 previously described, is arranged above the path of travel of the sheets outwardly of the rolls 223 and 227. A pipe 285 connects this hood to the pipe 277. The pipe 285 extends through a wall 286 forming a closure for the outlet side of the casing. The outer end of the wall 286 is secured to the wall 12 and is curved downwardly at its inner end as at 287. A lower hood 288 is arranged beneath the hood 284 and is secured to the adjacent portion of the hopper wall 31. This hood also is connected to the pipe 271.

A main vacuum pipe 289 is arranged outwardly of the casing 10 and is connected at one end to any suitable source of vacuum. A depending pipe 290 is connected at its upper end to the pipe 289 and at its lower end to upper and lower pipes 291 which connect the pipes 271 and 277 respectively. It will be apparent that the impacting of abrasive material against the surface of the sheets causes the abrasive to spread outwardly and the various vacuum hoods pick up any of the abrasive which finds its way thereinto to prevent injury to the rolls and to the bearings thereof. Means are provided to minimize the passage of abrasive material toward the inlet and outlet ends of the apparatus from the points of application of the abrasive to the sheet. As shown in Figures 4, 8, 9 and 10, the numeral 292 designates as a whole a plurality of stop doors. These doors are connected to the lower ends of the depending portions 268 of the hood 264, the lower end 121 of the partition 119, and to the lower end 287 of the wall 286. The lower ends of these doors are inclined downwardly toward the outlet end of the machine and contact respectively with each roll of the pairs 211 and 217, and from the arrangement described it will be apparent that these doors are adapted to be opened by the passage of the sheets to permit the latter to be fed through the apparatus. One of the doors is shown in detail in Figures 8, 9 and 10 of the drawings. Referring to these figures, the numerals 293 and 294 designate a plurality of leather strips arranged in edge to edge relation. As shown in Figure 9, the strips 293 are staggered with relation to the strips 294 and are secured at their upper ends to their respective supports by a steel strip or the like 295. A plurality of steel strips 296 are secured to the leather strips 294 and register therewith as shown in Figure 10. Small pieces of steel 297 also are secured to the lower ends of the strips 293 and register therewith as shown in Figure 9. The steel strips serve as weight means to normally maintain the doors in closed position, as shown in Figure 8, while the inner strips 296 serve as wear plates against which the forward edges of the sheets to be cleaned contact to cause the door to open, thus preventing wear on the leather strips.

Means are provided to properly position the sheets laterally as they pass through the apparatus and to prevent wear against the sides of the casing. As shown in Figure 4 side wear plates 298 are arranged within the casing between the hoods 265 and 270 and between the hoods 272 and 278. The ends 299 of these wear plates are preferably curved outwardly to properly guide the sheets. Similar wear plates 300 are arranged between opposite sides of the casing substantially centrally thereof, and these wear plates are preferably connected to relatively large plates 301 which preferably cover the central portions of the flexible elements 176 as shown in Figure 4 of the drawings. The plates 301 have been omitted from Figure 11 for the purpose of illustration. As previously stated, the impacting of the abrasive material against the sheets causes this material to be forced outwardly in all directions, and the plates 301 serve to protect the flexible elements 176 from the action of the abrasive.

In constructing the casing 10, it is preferred that a number of doors 302 be provided in order that access may be had to the interior of the apparatus for repairs, etc. These doors may be placed at any suitable points, and in the drawings I have shown one of these doors arranged in each lower hopper wall 31 and in each wall 11.

A brush 302, is preferably arranged adjacent the outlet side of the apparatus to remove from the lower surface of the sheets any abrasive particles which may adhere thereto. This brush is constructed similar to upper traveling brushes to be referred to later. The brush is mounted upon a pair of depending arms 303 secured to its end portions, and these arms are connected by a shaft 304. The shaft 304 is adapted to be supported in either of two pairs of brackets 305, as shown in Figures 4 and 14. The brush is initially supported by the lower brackets 305 and as wear takes place, the brush may be lifted and supported in the upper brackets 305 to efficiently clean the lower surface of the sheets. A depending arm 306 is rigidly connected to the shaft 304 and is provided in its lower end with a slot 307, through which a rod 308 extends. The inner end of this rod is connected to a head 309 which is pivotally connected to the adjacent hopper wall 31 as at 310. A pair of springs 311 and 312 surround the rod 308. The spring 311 is arranged between the head 309 and a washer 313, the latter contacting with one side of the rod 306. The spring 312 contacts at opposite ends with a similar washer 314, contacting with the rod 306, and a washer 315 mounted on the end of the rod 308. A nut 316 retains the washer 315 in position. It will be obvious that the slot 307 permits the brush 302 to be elevated whereby the shaft 304 may be supported in either pair of brackets 305.

Means are provided for cleaning the upper surfaces of the sheets after they have passed from the scale removing apparatus. Referring to Figures 14 and 15, the numeral 317 designates as a whole the supporting structure for the brushing apparatus referred to. This supporting structure includes a preferably hollow base portion 318 and a plurality of upstanding transverse bearing supports 319. Additional bearing supports 320 are arranged parallel to the sides of the supporting structure for a purpose to be described. Pairs of upper and lower feed rollers 321 and 322 are mounted on shafts 323 and 324 respectively journalled in the bearing supports 319. These bearing supports are shaped generally as indicated in Figure 17. The outer ends of the shafts 323 and 324 are provided with gears 325 and 326 respectively.

A pair of shafts 327 extend along one side of the supporting structure 317 and are supported in bearings 328 carried thereby. The shafts 327 are provided at their outer ends with worms 329 meshing with worm wheels 330 carried by two of the shafts 324. Intermediate its ends each of the shafts 327 is provided with a worm 331 meshing with a worm wheel 332 mounted upon a shaft 333 suitably journalled in the supporting structure 317. Each of the shafts 333 is provided with a gear 334 and these gears mesh with the other two gears 326. The shafts 327 are provided at their inner ends with bevel gears 335.

A vertical shaft 336 is arranged adjacent the supporting structure 317 and is journalled in bearings 337 carried thereby. The vertical shaft is provided with a bevel gear 338 meshing with the gears 335. It will be obvious that the shafts 327 will be rotated in opposite directions, and accordingly the worms 329 and 331 of one of the shafts 327 is pitched in an opposite direction to the worms of the other shaft 327. With such construction the feed rolls 321 and 322 will be properly rotated to feed the sheets through the brushing apparatus.

A bevel gear 339 is mounted on the lower end of the shaft 336 and meshes with a similar gear 340 carried by a transverse shaft 341. This shaft is adapted to be driven by an electric motor or other power source 342 through a suitable transmission. I prefer to employ a variable speed transmission indicated as a whole by the numeral 343. This transmission is similar to that previously described for driving the feed and guide rollers of the scale removing apparatus, and need not be referred to in detail.

The gear 326 toward the outlet end of the brushing apparatus meshes with a gear 344 mounted upon a shaft 345, and this gear, in turn, meshes with a gear 346 mounted upon a transverse shaft 347. The bearing supports 320 are provided with openings 348 to form guides 349, as shown in Figure 14. Bearing blocks 350 are mounted in the lower ends of the openings 348 and rotatably support the shaft 347. Upper slidable bearing blocks 351 are mounted in the guides 349 and rotatably support a transverse shaft 352. The latter shaft is provided with a plurality of spaced disks 353 which coact with a roll 354 mounted upon the shaft 347 to feed the sheets from the brushing apparatus. A spring 355 is arranged over each bearing block 351, tending to urge the latter downwardly together with the shaft 352 and disks 353, and a screw 356 is adapted to vary the tension of these springs.

A plurality of cross members 357 extend between the inner pair of bearing supports 319, and these cross members rotatably support a shaft 358 which extends transversely of the brushing apparatus. A bevel gear 359 is mounted on one end of the shaft 358 and meshes with a similar gear 360 secured to the upper end of the shaft 336, as shown in Figures 14 and 15. A pair of bevel gears 361 and 362 are carried by the shaft 358.

As shown in Figures 15 and 17, a shaft 362' is journalled in the pair of bearing supports 319 adjacent the inlet side of the brushing apparatus, that is, the side adjacent the scale removing apparatus. This shaft is provided with a rotatable sleeve 363' having secured to its inner end a bevel gear 363 which meshes with the gear 361 to be driven thereby. A pair of arms 364 are secured at one end to the shaft 362'. The opposite ends of these arms rotatably support a shaft 365 which carries a drum 366 about which a belt 367 is adapted to pass. One of the arms 364 carries a shaft 368 upon which is mounted a gear 369. This gear meshes with a gear 370 fixed to the sleeve 363' and with a similar gear 371 secured to the shaft 365. It will be apparent that rotation of the sleeve 363' is adapted to drive the shaft 365 through the gears 369, 370 and 371. Forwardly of the arms 364, a similar pair of arms 372 are mounted at one end upon a shaft 373 journalled in the adjacent bearing supports 319. The arms 372 are similar in size and construction to the arms 364 and are adapted to assume the same angular positions as the latter arms, as will become apparent. A shaft 374 is carried by the forward ends of the arms 372, and a drum 375 is mounted upon this shaft. The belt 367 also passes around the drum 375 as shown in Figure 17.

A plurality of brushes indicated as a whole by the numeral 376 are mounted upon the belt 367 to be operated thereby. One of these brushes is shown in detail in Figures 12 and 13 of the drawings. To support each of the brushes a socket 377 is mounted adjacent each edge of the belt 367 and one of these sockets is secured thereto by rivets or the like 378. The other socket may be secured to the belt by bolts 379 having counter-sunk heads, as shown.

Each of the brushes includes a preferably wooden base 380 having end portions 381 adapted to be arranged in the sockets 377. The bolts 379 are preferably employed for securing one of the sockets in position to permit removal of this socket whereby the brushes readily may be renewed when necessary. Each brush further includes a plurality of bristle sections 382 divided by relatively heavy leather strips 383, two of these strips being arranged at the extremities of the brush as shown in Figure 14. As will become apparent, these leather strips are intended to protect the bristles of the brush against the cutting action of the forward edges of the sheets to be brushed as the latter pass beneath the brushes.

The elements just described constitute one brushing unit, the lower run of which is adapted to travel in the direction of the arrow shown in Figure 15. A similar brushing unit 384 is adapted to be arranged between the pair of bearing supports 319 toward the outlet end of the brushing apparatus. The unit 384 is substantially the same as the unit previously described and need not be referred to in detail. It should be noted, however, that the lower run of the belt of the unit 384 travels in a direction opposite to that of the unit first described, as indicated by the arrow in Figure 15. It further should be noted that the arms 364 and 372 of the unit 384 are inclined in a direction opposite to that of the similar arms of the unit first described.

It will be apparent from the foregoing that the two brushing units are adapted to brush abrasive and any other loose material on the sheets toward opposite sides thereof.

As previously stated, the arms 364 and 372 are loosely mounted upon their shafts 362 and 373 and means are provided for changing the angularity of these arms to vary the height of the brushes above the sheets passing between the rolls 321 and 322. Referring to Figures 15 and 16, the numeral 385 designates a worm wheel carried by the shafts 362' and 373 of each of the brushing units. The worm wheels 385 of each brushing unit mesh with worms 386 carried by a shaft 387 journalled in suitable bearings 388 carried by the supporting structure 317. Each shaft 387 is provided with an operating wheel 389, and it will be apparent that rotation of this wheel is adapted to simultaneously vary the angular positions of the arms 364 and 372 controlled thereby.

Means are provided for maintaining a substantially constant level of sheets to be fed into the apparatus and then discharged therefrom. Referring to Figure 1 the numeral 390 designates a supporting platform arranged adjacent the inlet side of the scale removing apparatus. This platform may be provided at opposite sides with pivotally connected standards 391 which may be swung over to vertical or horizontal positions, as shown, according to the height of the pack of sheets ready to be fed into the apparatus. The platform 390 is arranged over a pit 391' and is supported on screws 392 extending downwardly into the pit. Each of the screws 392 is threaded in a collar 393 carried in the upper end of a support 394, each collar being provided with a thrust bearing 395. A worm wheel 396 is secured to each collar 393 and meshes with a worm 397 mounted upon a shaft 398. This shaft extends entirely beneath the scale removing and brushing apparatus and for a substantial distance on the opposite side of the latter, for a purpose to be described. A motor 399 is adapted to raise and lower the platform 390. A gear 400 is driven by the motor and meshes with a gear 401 associated with one element of a clutch 402, the other element of this clutch being secured to the shaft 398. A rod 403 is adapted to control the clutch, and this rod is connected to the lower end of an operating lever 404 which is pivotally connected intermediate its ends as at 405 with the casing 10. The motor is preferably of the reversible type to permit the worm wheel 396 to be rotated in either direction to raise or lower the platform.

Beneath the scale removing and polishing apparatus, the shaft 398 is supported by suitable bearings 406, one of which is preferably arranged substantially centrally of and beneath the trough 32. As shown in Figure 2, the bearing last referred to preferably has an upper horizontal extended portion 407 upon which the trough 32 rests. The extension 407 serves as a sliding support for the conveyor trough to facilitate the removal of the latter.

Beyond the brushing apparatus a pit 408 is provided similar to the pit 391. A platform 409 is arranged over this pit and is adapted to be operated by elements similar to those employed for elevating and lowering the platform 390 except that the single source of power previously described is adapted to operate both platforms. The worm and screw operating elements for the platform 409, therefore, need not be referred to in detail. As a safety feature, it is preferable to provide the platforms 390 and 409 with depending aprons 410 to prevent the feet of an operator from being caught beneath either platform as it is lowered. The gearing and drive means for the two platforms is so arranged that one platform travels upwardly while the other moves downwardly and at the same rate of speed.

The operation of the apparatus is as follows:

The pack of sheets to be cleaned is placed upon the platform 390, and if desired, the standards 391 may be swung to vertical positions, as will be apparent. The operating means for the platform 390 is controlled from the clutch 402 to place the platform at such a height that the upper sheet of the pack will be on a level corresponding to the space between the rolls 200 and 204. It will be apparent that under such conditions the feeding of the sheets into the cleaning apparatus will be greatly facilitated. As successive sheets are manually fed into the cleaning apparatus the platform control means may be operated to gradually elevate the platform 390 to maintain the top sheet of the pack thereon at the proper level. The sheets discharged from the cleaning and brushing apparatus will be fed onto the platform 409, the number of sheets deposited thereon obviously corresponding to the number taken from the pack on the platform 390. Thus the two platforms are equally geared whereby the platform 409 travels downwardly at the same speed that the platform 390 moves upwardly. The operating means for the platform readily may be controlled by manually operating the lever 404.

In order to properly feed and guide successive sheets through the cleaning apparatus, the various rolls within the latter are constantly rotated by the means described. The motor 263 operates the friction transmission means through the belt 261 to drive the pairs of conical members 256 and 257 at the desired relative speeds, and rotation of the members 256 is transmitted to the shaft 250 through the chain 252. The shaft 250 drives the worm 249 and worm wheel 248, and thus the shaft 241 will be driven through the bevel gears 244 and 243. Rotation of the shaft 241 drives the shaft 237 through the chain 239, and thus the endless chain 232 will be driven to actuate the various rollers of the cleaning apparatus through the sprockets carried by their shafts, as clearly shown in Figure 18. The rollers of the cleaning apparatus operate at a low speed by virtue of the speed reduction afforded by the drive between the worms 248 and 249 and through the usual functions of the friction transmission previously referred to.

Each sheet as it is fed into the cleaning apparatus, is first picked up by the rolls 200 and 204 the former being positively driven by the chain 232. The sheet will be maintained in firm contact with the roll 200 by the action of the springs 208, shown in Figure 4. As the forward edge of the sheet passes beyond the rolls referred to, it will pass over the first roll 211 and will contact with the flexible door 292, the latter being swung inwardly and upwardly by the movement of the sheet to permit the latter to pass between the hoods 264 and 270. The wear plates 298 tend to properly guide the sheets by preventing lateral displacement thereof. If the edge of the sheet tends to curl upwardly, it will be intercepted by the guides 267 to feed it between the rolls 214 and 211 adjacent the outlet sides of the hoods 264 and 270. Further movement of the sheet elevates the second door 292, whereupon the sheet progressively passes between the nozzles 84 and 114. Continued passage of the sheets through the apparatus will be clearly understood. The successive doors 292 will be opened, and the sheets will pass over the rolls 217 and beneath the rolls 220 whereupon the feed rolls 223 and 227 will engage the forward end of the sheet and feed it outwardly from the outlet side of the scale removing apparatus.

Referring to Figures 1 and 4, it will be apparent that abrasive material will be fed downwardly from the spout 17 into the trough 75 and spouts 124, when the gate 20 is open. This gate is controlled by the lever 25 (see Figure 3) as previously stated, movement of this lever swinging the shafts 22 upon which the gate 20 is supported. The rate of flow of the abrasive material is governed by the position of the plate or valve 26 shown in Figures 1 and 2. The screws 29 are employed for adjusting the valve 26 downwardly to decrease the flow of abrasive, and upwardly to increase the flow. The abrasive material, as previously stated, drops into the trough 75 and into the spouts 124, and from the trough 75 it will be fed downwardly into the chambers 81. Air under pressure is supplied to the passage 69 through the pipe 73 and conduit 74, illustrated in Figure 2, and the air under pressure flows downwardly through the jets 83. The air will be discharged at a high rate of speed through the axial openings 85 carrying with it abrasive particles from the chamber 81. The abrasive thus will be impacted against the upper surfaces of the sheet as the latter slowly travels between the sets of nozzles. The portion of the abrasive discharged from the spout 17 beyond the ends of the trough 75 will flow into the flared upper ends 123 of the spouts 122 and will be discharged from the lower ends of the latter into the trough 107. The abrasive flows into the chambers 113, from whence it will be picked up and blown upwardly through the axial openings 115 by the air from the jets 99. Air is supplied to these jets from the passage 94, which also provides air under pressure from the conduit 74 through the flexible pipe 98. Thus the abrasive also will be impacted against the lower surfaces of the successive sheets. The amount of air passing through the jets 83 and 99 readily may be governed by proper adjustment of the valves 87 and 100.

The nozzles 84 and 114 are arranged relatively close together as clearly shown in Figure 5, and means are provided for reciprocating these nozzles in alinement with each other and parallel to the surfaces of the sheets whereby all portions of the latter efficiently may be subjected to the action of the abrasive. Referring to Figures 3 and 6, it will be apparent that the shaft 169 will be driven by the motor 173 through gears 171 and 172, thus rotating the gears 167 and 165, the latter gears being mounted upon the shaft 166, shown in Figure 6. The gear 165 meshes with the gears 164 to rotate the latter, and these gears drive the eccentrics 160. Thus it will be apparent that the cranks 159 will rotate about the axes of the shafts 161 upon which the eccentrics are mounted. The action of the cranks causes the blocks 158 to travel in a circular path, the vertical movement of the blocks being permitted by their sliding connection with the guides 148, while the horizontal movements of the cranks will be transmitted to the shafts 71 and 96 to reciprocate the latter. Thus it will be apparent that both of the abrasive impacting devices will be constantly reciprocated in the manner referred to as the successive metal sheets pass therebetween. It has been found in actual practice that care must be taken in properly arranging or operating the parts referred to with respect to each other. For instance, in order to secure best results, it is desirable to space the abrasive discharge nozzles relatively close together and to reciprocate these elements relatively short distances and not at excessive speeds. In practice, I prefer to limit the reciprocation of the nozzles to three inches and the distance between the nozzles to a little less than three inches with the reciprocation taking place at a relatively low speed.

It will be obvious that it is particularly desirable to provide an even distribution of abrasive material to each chamber 81 and 113 whereby an even cleaning action will be provided by each blast nozzle. It is particularly difficult to secure such even distribution particularly as to the lower set of nozzles in view of the fact that the abrasive must be supplied to the lower abrasive impacting device outwardly of the edges of the sheets passing through the apparatus. As previously stated, the chutes or spouts 122 are arranged adjacent the walls 13, outwardly of the edges of the sheets passing through the apparatus, and beyond the trough 75. Thus it will be apparent that the abrasive material is fed into the trough 107 adjacent the ends thereof. The trough 107 is provided with the horizontal bottom wall portion 110, and it has been found that the reciprocation of the lower impacting device causes the abrasive to be evenly distributed throughout the length of the trough 107, the horizontal wall 110 assisting in this action. The horizontal wall 78 of the upper trough 75 also serves to evenly distribute the abrasive throughout the length of the upper impacting device. Accordingly it will be apparent that the abrasive material will be fed uniformly to all of the impacting nozzles of both the upper and lower impacting devices.

The flexible elements 176, illustrated in Figure 5, prevent the escape of abrasive material outwardly along the shafts 71, 72, 96 and 97. At the same time, these flexible elements permit free reciprocation of the abrasive impacting devices without the use of stuffing boxes or the like which would be impractical in view of the presence of the abrasive. The flexible elements also permit free vertical adjustment of the impacting means within reasonable limits, as will be apparent. The vertical adjustment of the impacting devices is accomplished by adjusting the screws 136 and 141 at each end of the apparatus, in the manner previously referred to, this vertical adjustment being adapted to move the supports 129 to place the impacting devices at the desired distances from the sheets being treated. It will be apparent that a fixed angular relationship between the direction of discharge of the abrasive and the surfaces of the sheets will be maintained by virtue of the contact between the rollers 135 and the squared portions 126 of the shafts 71 and 96, as shown in Figure 6. If it is desired to change this angular relationship, the bolts 133 may be loosened to relieve the clamping action between the plates 132 and the disks 131, whereupon the latter may be turned to any desired position. The swivel heads 154 permit this angular adjustment without affecting the action of the frames 147. Owing to the inertia of the relatively heavy reciprocating parts, it is preferred that the dash pot cylinders 188 be employed to cushion the action of the reciprocating parts adjacent the ends of the strokes thereof, and these dash pots also may be vertically adjusted by the screw 196 to permit them to be maintained in proper alinement with their associated reciprocating parts.

The abrasive discharged against the surfaces of each sheet tends to flow outwardly in all directions and the passage of the abrasive to the various rollers of the apparatus is minimized by the use of the doors 292, while damage to the flexible members 176 is minimized by the plates 301. Small quantities of the abrasive, however, may reach the rollers, and accordingly I have provided the vacuum hoods to carry off the abrasive. The operation of these hoods will be apparent and it is obvious that they tend to prevent damage to the rollers and their bearings due to the action of the abrasive. The majority of the abrasive discharged from the nozzles will remain within the central portion of the casing, the abrasive discharged against the lower surface of the sheet immediately falling into the lower hopper formed by the walls 31. Most of the abrasive discharged against the upper surface of a sheet will remain thereon until the sheet has passed beyond the nozzles whereupon it will fall into the lower hopper, as will be apparent. The abrasive material obviously will be fed from the lower hopper into the conveyor trough 32, and the conveyor therein will move the abrasive to the discharge pipe 44 through which it flows by gravity to the vertical conveyor 45. This conveyor is driven by the motor 47 in the manner previously stated and is adapted to elevate the abrasive fed to the lower end thereof, and to discharge it into the spout 56 from whence it returns to the upper hopper 15. Thus it will be apparent that the abrasive material is used repeatedly. The abrasive material falling into the lower hopper 31 obviously contains fine particles of scale which has been removed from the sheet, and this scale is somewhat lighter than the abrasive material which it is preferred to employ. In this connection it might be stated that fine steel particles have been found highly efficient as an abrasive medium. It obviously is desirable to separate the scale particles from the abrasive as the latter is returned to the hopper 15. Accordingly the blower 57 is provided, and the suction created within the hopper 15 effectually provides for the carrying off of the scale particles through the conduit 58. The blower 57 and the various vacuum hoods employed in the apparatus serve to prevent the building up of such a pressure in the casing by the action of the blast nozzles as would prevent the flow of abrasive material from the lower end of the hopper 15 by gravity. Thus there is a free and uninterrupted flow of abrasive material to the impacting devices during the operation of the apparatus.

When it is desired to remove the abrasive material from the apparatus for the purpose of employing newer or sharper abrasive, or for the purpose of employing an abrasive of a different degree of coarseness, the door 60 is swung to operative position as indicated in Figure 1 whereupon the abrasive material will be fed from the pipe 56 to the pipe 61 without flowing into the hopper 15 to be discharged therefrom in the usual manner. Thus all of the abrasive material, as it is progressively lifted by the conveyor 45, will be discharged into the pipe 61, and may be collected from the branch pipe 64 connected thereto. Suitable sacks may be arranged beneath the doors 65 to collect the abrasive material.

It will be obvious that practically all of the abrasive material and loosened scale will fall by gravity from the lower side of each successive sheet, but it is preferred to provide brushing means to further clean the lower sides of the sheets to remove such of the loosened particles as may adhere thereto. It will be obvious that as each successive sheet is fed from the outlet side of the apparatus, it will pass over the brush 302 shown in Figures 4 and 14. This brush is adapted to remove the loosened particles from the lower surfaces of the sheet, as will become apparent. The springs associated with this brush are adapted to provide a cushion action to minimize damage to the brush by the edges of the successive sheets striking thereagainst. The brush 302 is constructed similar to the brush 376, shown in Figures 12 and 13, and includes the spaced leather elements arranged transversely of the brush. These leather strips provide further protection from the bristles of the brush to prevent the edges of the sheets from cutting through the bristles. As the brush 302 becomes badly worn, the shaft 304, connected between the arms 303, may be elevated to the upper hooks 305 thus permitting the worn brush to be used for an additional length of time.

It will be obvious that some loose particles will remain on the upper surfaces of the sheets and it is desirable to remove such loose material. After each sheet passes from the scale removing apparatus and over the brush 302, it will be received between the first rolls 321 and 322 of the brushing apparatus.

These rolls act as feed means to project the sheets through the brushing apparatus, the forward portions of the sheets being progressively picked up and fed through the brushing apparatus by the successive feed rolls. Inasmuch as the thickness of the sheets vary somewhat, the heavy feed roll 354 and its associated disks 355, shown in Figure 15, are employed for positively moving the sheets through the brushing apparatus. The sheets first pass beneath the first set of brushes 376, and then beneath the second set. The belts carrying these brushes are driven through the trains of gears 369, 370 and 371, by the bevel gears 363, carried by the sleeves 363'. The gears 363 derive their rotation from the gears 362, and being arranged on opposite sides thereof, it will be apparent that the brushes will be driven in opposite directions. The lower run of the belt carrying the first set of brushes 376 travels from the center of the cleaning apparatus toward the outer edge thereof, as shown by the arrow in Figure 15, while the other set of brushes 376 travels in the opposite direction. Thus it will be seen that the upper surfaces of successive sheets will be cleaned from the center toward the edges thereof. The arrangement of the brushes serves to efficiently clean the sheets without the necessity of either brush traveling the full width of the sheet, and also obviates the necessity of either set of brushes contacting with the longitudinal edges of the sheets to cause excessive wear.

It will be apparent that the handles 389 provide convenient means for varying the vertical positions of the traveling brushes shown in Figures 15, 16 and 17. Rotation of either handle 389 rotates the worms 386 carried thereby, and these worms in turn operate the shafts 362' and 373 to swing the arms 364 and 372 upwardly. These arms are of equal length and are operated simultaneously, and accordingly it will be apparent that they are always parallel, and that the lower runs of the brushes are always parallel to the upper faces of the sheets. Thus it will be apparent that any desired tension between the brushes and the sheets may be obtained.

From the foregoing it will be apparent that the impacting nozzles are reciprocated through relatively short distances and maintain a constant angular relationship with respect to the surfaces of each sheet as the latter passes therebetween, and the path of reciprocation of each nozzle slightly overlaps that of the next adjacent nozzle. It has been found that the apparatus thoroughly removes scale from the sheets without marring the surfaces of the sheets by pitting them or streaking them in any manner. The apparatus therefore presents material advantages over abrasive impacting means previously tried for this purpose, it having been found that such machines mar the surfaces of the sheets thus rendering them unfit for high class work such as automobile bodies and the like. The apparatus also provides the additional material advantage of cleaning the sheets without leaving deposits of acid or similar material on the sheets and in the pores of the metal. Thus the sheets may be left for a considerable period of time after being cleared without any corrosion occurring on the surfaces.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a pair of abrasive impacting devices between which sheets are adapted to be conveyed, each of said impacting devices including a horizontal elongated trough adapted to receive abrasive and a plurality of closely arranged alined abrasive chambers directly communicating therewith, an abrasive impacting nozzle associated with each of said chambers to receive abrasive therefrom, the nozzles of each impacting device being arranged in alinement with each other and extending at a fixed angle to the path of travel of the sheets, the nozzles of each device extending entirely across the sheet and being arranged parallel to one of the surfaces of each successive sheet and adapted to impact abrasive in straight streams thereagainst, and means for moving said impacting devices across the sheets without changing the angular relationship between said nozzles and the surfaces of the sheets.

2. Apparatus of the character described comprising a pair of spaced abrasive impacting devices between which sheets are adapted to be conveyed, each of said impacting devices including a plurality of alined nozzles extending at an angle to the path of travel of the sheets, an abrasive hopper adapted to discharge abrasive directly into one of said impacting devices, a pair of spouts arranged on opposite sides of the sheets passing between said impacting devices, said spouts being adapted to receive abrasive material from said hopper and deliver it to the other of said impacting devices, means associated with said last named device for uniformly distributing abrasive to the nozzles thereof, and means for reciprocating said impacting devices in alinement with said nozzles.

3. Apparatus of the character described comprising a pair of spaced upper and lower abrasive impacting devices between which sheets are adapted to be conveyed substantially horizontally, each of said impacting devices including a plurality of nozzles extending in a line arranged at an angle to the path of travel of the sheets and equidistantly spaced therefrom, said nozzles being arranged at an angle to the surfaces of the sheets and adapted to impact abrasive thereagainst, an abrasive hopper adapted to discharge abrasive directly into one of said impacting devices, a pair of spouts arranged on opposite sides of sheets passing between said impacting devices, said spouts being adapted to receive abrasive material from said hopper and deliver it to the other of said impacting devices, means including a horizontal shelf associated with said last named device for uniformly distributing abrasive to the nozzles thereof, and means for reciprocating said impacting devices in alinement with said nozzles.

4. Apparatus of the character described comprising a pair of spaced abrasive impacting devices between which sheets are adapted to be conveyed, each of said impacting devices comprising a plurality of closely arranged alined nozzles extending entirely across the sheets at an angle to the path of travel thereof and equidistantly spaced therefrom, said nozzles being arranged at a fixed angle to the surfaces of the sheets to impact abrasive thereagainst, a hopper, single means associated with each of said impacting devices for receiving abrasive material from said hopper and delivering it uniformly to said nozzles, a valve for varying the rate of discharge of abrasive material from said hopper to said means, and means for reciprocating said impacting devices without changing the angular relationship between said nozzles and the surfaces of the sheets.

5. An abrasive impacting device comprising an integral body including a longitudinal trough having horizontal and inclined bottom portions connected to each other and extending longitudinally thereof, and a plurality of alined chambers arranged adjacent and at one side of the inclined bottom portion of said trough and parallel thereto, said chambers being adapted to receive abrasive material from said trough, abrasive discharge nozzles associated with each of said chambers, and adapted to receive abrasive therefrom, an air nozzle for each abrasive discharge nozzle and means for reciprocating said body in alinement with said nozzles.

6. Apparatus of the character described comprising a casing, a pair of spaced abrasive impacting devices between which sheets are adapted to be conveyed, said impacting devices being arranged on opposite sides of said sheets and each comprising a plurality of nozzles extending across the sheet at an angle to the path of travel and parallel to the surfaces thereof, shafts carried by said impacting devices, said casing being provided with openings through which said shafts extend, means for supporting said shafts to permit reciprocation thereof, and flexible members arranged between said shafts and the edges of said openings and forming closures for the latter.

7. Apparatus of the character described comprising a casing, a pair of spaced abrasive impacting devices between which sheets are adapted to be conveyed, said impacting devices being arranged on opposite sides of said sheets and each comprising a plurality of nozzles extending across the sheets at an angle to the path of travel and parallel to the surfaces thereof, alined shafts carried by said impacting devices at opposite ends thereof, means for supporting said shafts whereby they are adapted to be reciprocated but not rotated, means for adjusting said supporting means for varying the distances of said impacting devices from each other, and means for reciprocating said shafts.

8. Apparatus constructed in accordance with claim 7 provided with mountings for the supporting means of said shafts whereby the angular positions of the latter may be varied.

9. Apparatus of the character described comprising a casing, a pair of spaced abrasive impacting devices between which sheets are adapted to be conveyed, said impacting devices being arranged on opposite sides of said sheets and each comprising a plurality of nozzles extending across the sheets at an angle to the path of travel and parallel to the surfaces thereof, alined shafts carried by the opposite ends of said impacting devices, one shaft of each impacting device being provided with a polygonal portion, supports for said shafts, rollers carried by certain of said supports and engaging the faces of said polygonal portions to permit said impacting devices to be reciprocated but not rotated, and means for reciprocating said shafts simultaneously.

10. An abrasive impacting device comprising an integral body including a longitudinal trough having horizontal and inclined bottom portions connected to each other and extending longitudinally thereof, a plurality of alined chambers arranged adjacent one side of said trough and parallel thereto, said chambers being adapted to receive abrasive fed thereto from said trough across the inclined bottom portion thereof, a nozzle communicating with each of said chambers, said body being provided with a longitudinally extending air passage arranged above said chambers, a jet communicating with said passage and extending into each of said chambers in alinement with one of said nozzles, means for supplying air to said passage, means for supporting said body for reciprocation, and means connected to said last named means for varying the angle of discharge of abrasive from said nozzles.

11. Apparatus of the character described comprising a casing, a pair of spaced abrasive impacting devices between which sheets are adapted to be conveyed, said impacting devices being arranged on opposite sides of the sheet and each comprising a plurality of closely arranged nozzles extending entirely across the sheets at an angle to the path of travel and parallel to the surfaces thereof, shafts carried by said impacting devices and extending through said casing, said casing being provided with openings through which said shafts extend, flexible members forming closures for said openings and connected to said shafts, means externally of said casing for reciprocating said shafts, and means independent of said reciprocating means for varying the distance of the nozzles of each impacting device from the sheet.

In testimony whereof I affix my signature.

HAROLD E. McCRERY.